US005294484A

United States Patent [19]

Kobayashi et al.

[11] Patent Number: 5,294,484

[45] Date of Patent: Mar. 15, 1994

[54] POLYVINYL AROMATIC CARBOXYLIC ACID ESTER AND VIDEO PRINTING PAPER

[75] Inventors: Rikio Kobayashi; Masanobu Hida, both of Kanagawa, Japan

[73] Assignee: Sony Corporation, Tokyo, Japan

[21] Appl. No.: 30,380

[22] PCT Filed: Jul. 31, 1992

[86] PCT No.: PCT/JP92/00979

§ 371 Date: Mar. 31, 1993

§ 102(e) Date: Mar. 31, 1993

[30] Foreign Application Priority Data

Aug. 3, 1991 [JP] Japan .................................. 3-217816
Aug. 3, 1991 [JP] Japan .................................. 3-217818

[51] Int. Cl.[5] .............................................. B32B 23/08
[52] U.S. Cl. ...................................... 428/511; 526/326
[58] Field of Search ......................... 428/511; 526/326

[56] References Cited

U.S. PATENT DOCUMENTS

| | | | |
|---|---|---|---|
| 2,129,667 | 9/1938 | Barrett et al. | 526/326 |
| 2,129,685 | 9/1938 | Graves | 526/326 |
| 2,276,138 | 4/1940 | Alderman et al. | 526/326 |
| 2,477,293 | 7/1949 | Filachione et al. | 526/326 |
| 2,612,475 | 9/1952 | Bartlett | 526/326 |
| 3,189,583 | 6/1965 | McCaw et al. | 526/326 |
| 4,393,184 | 7/1983 | Tarumi et al. | 526/326 |
| 4,567,114 | 1/1986 | Oshima et al. | 428/511 |

FOREIGN PATENT DOCUMENTS

| | | | |
|---|---|---|---|
| 0228301 | 7/1987 | European Pat. Off. | 428/511 |
| 47-5908 | 3/1972 | Japan . | |
| 59-122566 | 7/1974 | Japan | 526/326 |
| 49-132175 | 12/1974 | Japan . | |
| 55-118911 | 9/1980 | Japan | 526/326 |
| 58-68743 | 4/1983 | Japan | 526/326 |
| 61-127392 | 6/1986 | Japan | 428/511 |
| 62-10121 | 1/1987 | Japan | 526/326 |

*Primary Examiner*—Joseph L. Schofer
*Assistant Examiner*—N. Sarofim
*Attorney, Agent, or Firm*—Hill, Steadman & Simpson

[57] ABSTRACT

Video printing paper used for a video printer is disclosed. A receiving layer comprising a polymeric material is formed on a surface of the video printing paper. Polyvinyl aromatic carboxylic acid ester or copolymer of it is used for the receiving layer. In the receiving layer, resin compatible with the polyvinyl aromatic carboxylic acid ester or its copolymer may also be used by 50 percent by weight or less. It is also possible to add a compound enhancing the dyeing property to the receiving layer. The compound for enhancing the dyeing property are exemplified by ester compounds and urethane compounds. This enables formation of an image superior in light resistance and weather resistance.

5 Claims, 7 Drawing Sheets

POLYVINYL AROMATIC CARBOXYLIC ACID ESTER AND VIDEO PRINTING PAPER

TECHNICAL FIELD

The present invention relates to video printing paper, and more particularly to video printing paper having a receiving layer consisting essentially of polyvinyl aromatic carboxylic acid ester or copolymer of it.

BACKGROUND ART

Conventionally, attempts to form an image on video printing paper have been made in the following manner. That is, an image composed of a dyestuff transferred onto a surface of resin-coated paper by heating an ink ribbon having a dyestuff layer containing a sublimating-type disperse dye with a thermal head in a dot pattern in accordance with video signals is formed. The Video printing paper has a two-layer structure of a receiving layer and a sheet-like base material. The receiving layer is a layer for receiving the image composed of the dyestuff transferred from the ink ribbon, for example, a sublimating-type disperse dye, and maintaining the image formed by receiving the dyestuff. Up to now, polyester copolymer, polycarbonate copolymer, and polyvinyl chloride copolymer have been used as materials composing the receiving layer.

However, the image formed on the conventional video printing paper with the receiving layer composed of the above-mentioned resin has been insufficient in dyeing property, light resistance, and weather resistance. Therefore, occasionally visibility of the formed image declined, or the color of the image changed. This is believed to be due to susceptibility of the dyestuff to light, moisture, and oxygen in the air, because of the presence of the dyestuff transferred by the thermal head in the vicinity of the surface of the receiving layer.

DISCLOSURE OF THE INVENTION

Thus, it is an object of the present invention to provide polyvinyl aromatic carboxylic acid ester having an unprecedentedly high average polymerization degree, and simultaneously having excellent film formation performance, adhesion, flexibility and glossiness. It is another object of the present invention to provide video printing paper of polyvinyl aromatic carboxylic acid ester whereby an image formed by transfer of a dyestuff exhibits high light resistance and weather resistance.

In order to achieve the above-mentioned objects, the present inventors have continued research on catalysts for polymerizing aromatic carboxylic acid vinyl ester, and have thoroughly examined a wide range of compounds developed as radical polymerization catalysts. As a result, the present inventors have found out that a polymer exhibiting a significantly high polymerization degree and excellent film formation performance can be obtained only when a particular catalyst, that is, 1,1'-azobis (cyclohexane-1-carbonitrile) or 4,4'-azobis (4-cyanovaleric acid), is used.

The present invention is completed on the basis of such knowledge. Namely, according to the first aspect of the present invention, there is provided homopolymer of aromatic carboxylic acid vinyl ester exhibiting an average polymerization degree of 400 or above.

According to the second aspect of the present invention, there is provided 1,1'-azobis (cyclohexane-1-carbonitrile) or 4,4'-azobis (4-cyano-valeric acid) as a catalyst for polymerizing aromatic carboxylic acid vinyl ester so as to synthesize polyvinyl aromatic carboxylic acid ester.

The polyvinyl aromatic carboxylic acid ester of the present invention is homopolymer of aromatic carboxylic acid vinyl ester, exhibiting an average polymerization degree of 400 or above. The polyvinyl aromatic carboxylic acid ester with such a high polymerization degree has never been synthesized, and is provided for the first time by the present invention.

With the average polymerization degree of 400 or above, the polyvinyl aromatic carboxylic acid ester of the present invention exhibits excellent performance as a polymeric material. The polyvinyl aromatic carboxylic acid ester is superior in adhesion, flexibility, and glossiness, which are characteristics of polycarboxylic acid vinyl ester, and also exhibits film formation performance sufficient for practical use. Accordingly, the polyvinyl aromatic carboxylic acid ester can be broadly applied to adhesives, coating materials, and receiving layers of printing paper.

As described above, the average polymerization degree is important in the polyvinyl aromatic carboxylic acid ester. If the average polymerization degree is below 400, performance of the polymer as a polymeric material becomes insufficient, and the polymer cannot be molded filmily. For film formation performance, the polymerization degree is preferably 1000 or above.

The above-mentioned polyvinyl aromatic carboxylic acid ester having a high polymerization degree can be synthesized only when 1,1'-azobis(cyclohexane-1-carbonitrile)or 4,4'-azobis (4-cyanovaleric acid) is used as the polymerization catalyst. Therefore, either one of these polymerization catalysts is used in a production method of the present invention.

Chemical Formulas 1 and 2 show structural formulas of 1,1'-azobis (cyclohexane-1-carbonitrile) and 4,4'-azobis (4-cyanovaleric acid), respectively.

[Chemical Formula 1]

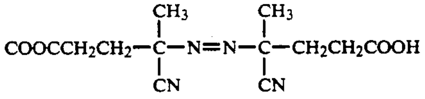

[Chemical Formula 2]

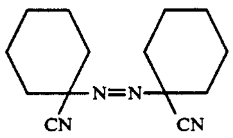

Usual polymerization methods, such as block polymerization and solution polymerization, can be employed. In each case, the polyvinyl aromatic carboxylic acid ester having the high polymerization degree can be synthesized with high yield.

If 1,1'-azobis (cyclohexane-1-carbonitrile) or 4,4'-azobis (4-cyano-valeric acid) is used as the catalyst for polymerizing aromatic carboxylic acid vinyl ester, polymerization activity is improved, and homopolymer of carboxylic acid vinyl ester having a polymerization degree of 400 or above can be synthesized with high yield. In addition, the homopolymer of carboxylic acid vinyl ester synthesized in this manner is superior in adhesion as well as in film formation performance.

Meanwhile, the video printing paper of the present invention has a receiving layer to which a dyestuff melted or sublimated by heating is transferred. In the video printing paper on which an image is formed by the dyestuff transferred to the receiving layer thereof, the receiving layer contains the polyvinyl aromatic carboxylic acid ester or the copolymer of it.

Further, the receiving layer contains up to 50 percent by weight of another resin which is compatible with the polyvinyl aromatic carboxylic acid ester or the copolymer of it.

Still further, the compound for enhancing dyeing property is an ester compound or a urethane compound.

If the polyvinyl aromatic carboxylic acid ester or the copolymer of it is used as a main component of the receiving layer, the dyeing property, weather resistance, and light resistance are improved compared with a case in which another type of polyester resin is used. Further, if an ester or urethane compound is added to the polyvinyl aromatic carboxylic acid ester or the copolymer of it, or if another resin compatible with a mixture of the polyvinyl aromatic carboxylic acid ester or the copolymer of it and the ester or urethane compound is mixed into the mixture, the light resistance can be further improved.

BEST MODE FOR CARRYING OUT THE INVENTION

Figure 1:
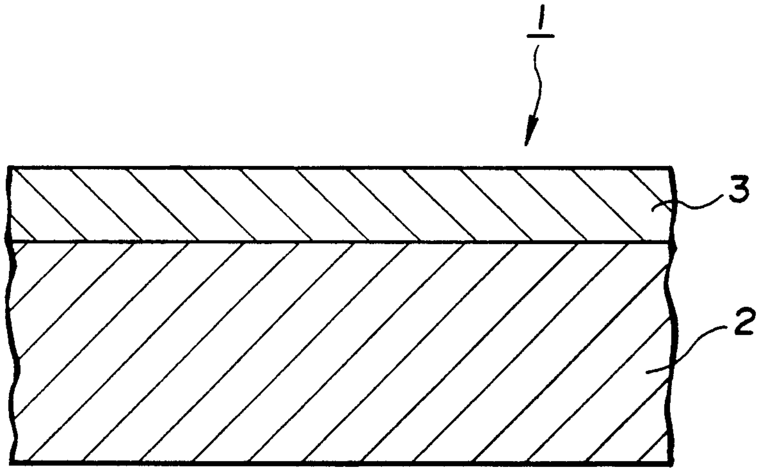
FIG. 1 is a cross-sectional view of video printing paper.

Video printing paper according to the present invention comprises a receiving layer 3 formed on a sheet-like substrate 2, as shown in FIG. 1. The video printing paper is used together with an ink ribbon having a dyestuff layer containing a dyestuff which is melted or sublimated, for example by heating to be transferred. An image is formed by the transfer of the dyestuff melted or sublimated by heating to the receiving layer 3 consisting essentially of resin.

The video printing paper has the receiving layer consisting mainly of polyvinyl aromatic carboxylic acid ester or aromatic carboxylic acid vinyl ester copolymer (copolymer of aliphatic carboxylic acid ester, acrylic acid, acrylic acid derivative, methacrylic acid, methacrylic acid derivative, styrene, styrene derivative, acrylonitrile, acrylonitrile derivative, vinyl alcohol, maleic acid, maleic acid derivative, and aromatic carboxylic acid vinyl ester), thereby solving the problem in the prior art.

For further improving characteristics such as dyeing property, it is preferable that the polymerization degree of the polyvinyl aromatic carboxylic acid ester or the copolymer of it be 400 or higher. Also, it is preferable that the aromatic carboxylic acid ester copolymer contain 0 to 0.5 mole of another monomer component for 1 mole of the aromatic carboxylic acid vinyl ester. Although the polyvinyl aromatic carboxylic acid ester improves in adhesion by becoming copolymer, if the ratio of the other monomer component becomes larger, the heat resistance deteriorates and blocking performance becomes poorer.

The polyvinyl aromatic carboxylic acid ester or the copolymer is prepared by the following two methods:

1. Radical polymerization or copolymerization with aromatic carboxylic acid vinyl ester monomer or its vinylic monomer; and 2. Polymeric reaction of polyvinyl alcohol or its copolymer and aromatic carboxylic acid or its derivative.

As aromatic carboxylic acid vinyl ester, numerous compounds are known, such as, vinyl m-chlorobenzoate, vinyl p-chlorobenzoate, vinyl 2,4-dichlorobenzoate, vinyl 2,3,4,5-tetrachlorobenzoate, vinyl m-nitrobenzoate, vinyl p-nitrobenzoate, vinyl p-cyanobenzoate, vinyl o-toluate, vinyl m-toluate, vinyl p-toluate, vinyl m-anisate, vinyl p-anisate, vinyl salicylate, vinyl p-acetylbenzoate, vinyl p-dimethylaminobenzoate, vinyl o-acetylsalicylate, vinyl 3,4,5-trimethoxybenzoate, vinyl 1-naphthoate, vinyl 2-naphthoate, vinyl p-phenylbenzoate, vinyl 2-naphthylbenzoate, vinyl a-stilbenecarboxylate, vinyl o-phthalimidebenzoate, vinyl p-phthalimidebenzoate, vinyl anthracene-1-carboxylate, vinyl transcinnamate, vinyl p-methoxycinnamate, vinyl 2-furancarboxylate, vinyl courmarilate, vinyl 2-thiophenecarboxylate, and vinyl 2-thionaphthenecarboxylate, vinyl nicotinate. In the present invention, many types of aromatic carboxylic acid ester listed here may be used, but the invention is not limited to this listing. The radical polymerization of aromatic carboxylic acid vinyl ester has been studied, mainly by using benzoic acid vinyl ester as monomer. According to the findings of the studies, it is reported that the homopolymerization of benzoic acid vinyl ester is extremely poor and high polymer cannot be obtained, whereby there is no practical significance in the result. The reason for the low activity of benzoic acid vinyl ester radicals is believed to be stabilization by benzene nucleus of the radicals, as shown in chemical formula 3.

[Chemical Formula 3]

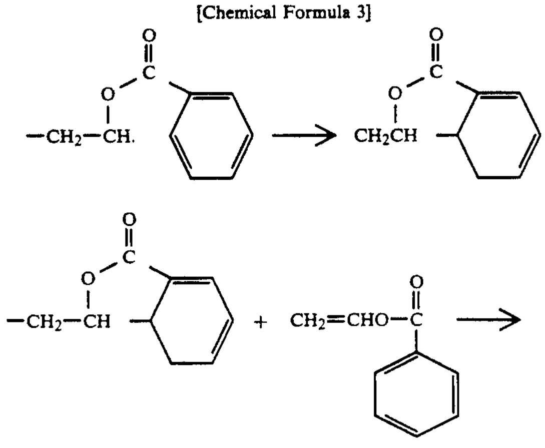

-continued

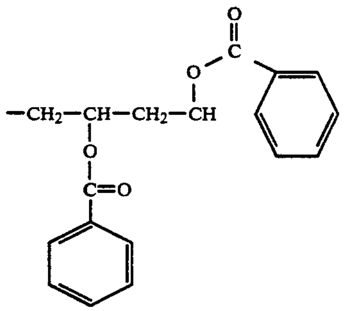

Meanwhile, the present inventors have engaged in extensive studies on high polymerization of vinyl aromatic carboxylic acid ester, considering that the chemical structure of the polyvinyl aromatic carboxylic acid ester is best for printing conditions caused by the dyestuffs and video equipment used by the present inventors. As a result, the present inventors found that 1,1'-azobis (cyclohexane-1carbonitrile) and 4,4'-azobin (4-cyanovaleric acid) radical polymerization initiators or catalysts are extremely effective, and that the use of these types of catalysts makes it possible to synthesize aromatic carboxylic acid vinyl ester homopolymer by usual polymerization methods such as block polymerization and solution polymerization.

Further, since it is difficult to obtain polymer by homopolymerization of aromatic carboxylic acid vinyl ester, a method has been reported for synthesizing polyvinyl aromatic carboxylic acid ester by a polymeric reaction of polyvinyl alcohol or its copolymer and aromatic carboxylic acid or its derivative, for instance, in H. Staudinger, Ber.60, 1782 (1972); Noma et al ,Koka, 4, 34 (1947) ; and M. Tsuda, Makromol , Chem. 72, 174 (1964).

In the present invention, ester or urethane is added to the polyvinyl aromatic carboxylic acid ester or the copolymer of it in the resin of the receiving layer for the purpose of developing a receiving layer with higher performance. By adding ester or urethane, the dyeing property, light resistance, dark fading resistance, and other facets of performance are much improved.

First, as ester, numerous compounds known as "plastic" can be used for this purpose. In addition, there are many compounds for which synthesis or suitability have been studied for this purpose.

Specifically, the following types of ester with melting points under ordinary pressure of 180° C. are effective: ester with aliphatic or alicyclic alcohol of aromatic, aliphatic, or alicyclic polybasic acids; ester with phenol; and aromatic or aliphatic carboxylic acid ester of polyhydric alcohol including phenol.

Typical examples of compounds suitable for this purpose are listed below. However, the compounds applicable to the present invention are not limited to these.

First, polyhydric phenol ester is exemplified by catechol diacetic acid ester, catechol dipropionic acid ester, catechol dibutyric acid ester, catechol dibenzoic acid ester, catechol dio-toluic acid ester, catechol di-p-toluic acid ester, catechol acetic acid benzoic acid ester, catechol dicrotonic acid ester, resorcin diacetic acid ester, resorcin dibutyric acid ester, resorcin butyric acid benzoic acid ester, resorcin dibenzoic acid ester, hydroquinone diacetic acid ester, hydroquinone benzoic acid ester, hydroquinone dicaproic acid ester, pyrogallol triacetic acid ester, pyrogallol tribenzoic acid ester, bisphenol A butyric acid ester, bisphenol A benzoic acid ester, 4,4'-methylene bis-(2,6-di-isopropyl) diacetic acid ester, and 4,4' thiobisphenol butyric acid ester.

Polyhydric alcohol ester is exemplified by ethylene glycol dibenzoic acid ester, diethylene glycol di-p-toluic acid ester glycerine tribenzoic acid ester, glycerine triacetic acid ester pentaerythritol tetrapropionic acid ester, pentaerythritol tetrabenzoic acid ester, hydrogenated bisphenol A diacetic acid ester, hydrogenated bisphenol A dibenzoic acid ester, and dipentaerythritol benzoic acid ester.

Phthalic acid ester is exemplified by dimethyl phthalic acid ester, diethyl phthalic acid ester, dibutyl phthalic acid ester, dioctyl phthalic acid ester, diphenyl phthalic acid ester, dicresyl phthalic acid ester, phenyl ethylene phthalic acid ester, dibenzoyl phthalic acid ester, diphenoxyethyl phthalic acid ester, dicyclohexyl phthalic acid ester, dimethylisophthalic acid ester, diphenyl isophthalic acid ester, dibenzyl isophthalic acid ester, and diethyl terephthalic acid ester.

Aromatic polybasic acid ester is exemplified by triethyl trimellitic acid ester, tribenzyl trimellitic acid ester, trioctyl trimellitic acid ester, tetraethyl pyromellitic acid ester, and tetracyclohexyl pyromellitic acid ester.

Alicyclic carboxylic acid ester is exemplified by dioctyltetrahydro phthalic acid ester, diphenyltetrahydro phthalic acid ester, and dibenzyltetrahydro phthalic acid ester.

Aliphatic polybasic acid ester is exemplified by diphenyl succinic acid ester, dimethyl succinic acid ester, dibenzyl succinic acid ester, dibenzyl adipic acid ester, dimethyl adipic acid ester, diethyl azelaic acid ester, dibenzyl sebacic acid ester, diphenyl sebacic acid ester, diethyl maleic acid ester, dibenzyl maleic acid ester, diphenyl maleic acid ester, dibenzyl fumaric acid ester, diphenyl fumaric acid ester, tribenzyl citric acid ester, acetyl tribenzyl citric acid ester, and dimehtyl itaconic acid ester.

Phosphoric acid ester is exemplified by triphenyl phosphoric acid ester, tribenzyl phosphoric acid ester, cresyl diphenyl phosphoric acid ester, trixylic phosphoric acid ester, tricyclohexyl phosphoric acid ester, and tetrakis (2,4-di-tertbutylphenyl)-4,4'-biphenyl phosphoric acid ester.

Carbonic acid ester is exemplified by diphenyl carbonic acid ester, di-o-methylphenyl carbonic acid ester, di-p-methylphenyl carbonic acid ester, dinaphthyl carbonic acid ester, di-o-phenylphenyl carbonic acid ester, di-p-phenylphenyl carbonic acid ester, and dioctyl carbonic acid ester.

Monoester is exemplified by 2,2,4-trimethyl-pentane diol monophthalic acid ester, phenyl monophthalic acid ester, methyl stearic acid ester, phenyl lauric acid ester, benzyl salicylic acid ester, and propyl-p-hydroxy benzoic acid ester.

In addition, methoxy benzoic acid benzyl ester and phenoxy benzoic acid butyl ester can be used.

Next, N-alkyl carbamic acid ester and aryl (substituent) carbamic acid ester, hereinafter referred to as urethane, which are effective as additives are exemplified by 1,6-hexamethylene dibutyl urethane, 1,6-hexamethylene dioctyl urethane, m-xylene dibutyl urethane, p-xylene dioctyl urethane, 2,4-toluene dihexyl urethane, 2,6-toluene dibenzyl urethane, 4,4'-diphenylmethane dibutyl urethane, 4,4'-diphenylmethane dioctyl urethane, ethylene diphenyl urethane, 1,4-tetramethylene diphenyl urethane, 1,6-hexamethylene di-p-methyl phenyl urethane, p-xylene di-p-chlorophenyl, o-xylene dibutyl urethane, and m-xylene dicyclohexyl urethane.

The amount added of these ester or urethane compounds is 1 to 70 percent by weight, preferably 5 to 50 percent by weight, for the polyvinyl aromatic carboxylic acid ester or the copolymer of it. These compounds are added to the polymer solution or added when the polymer is heated to melt, and sufficiently mixed. The resulting mixture is then used as resin.

Each of the above compounds is monomer, but oligomer of the above compounds may also be used in carrying out the present invention. For example, there are oligo polyester of dibasic acids and glycol, cyclized oligoester of ring-shaped ester, monomer of vinyl ester, and oligourethane with an excess of glycol component obtained from glycol and diisocyanate. Specifically, these types of oligomer are polytetraadipate, polyhexamethylene succinate, poly-m-xylene glycol sebacate, polycaprolactone, polyvinyl benzoate, oligourethane obtained by reacting 2 moles of hexamethylene diisocyanate with 3 moles of tetramethylene glycol, and oligourethane obtained by reacting 2 moles of m-xylene diisocyanate with 3 moles of octamethylene glycol. The polymerization degree of the oligomer is suitably 5 or below.

By mixing, into a mixture of the polyvinyl aromatic carboxylic acid ester or the copolymer of it and an ester or urethane compound added thereto, another type of resin compatible with the mixture, it is possible to obtain a receiving layer material having even better characteristics. Specific examples of such types of resin are given below. Note that the resin mentioned below may be used alone or as a mixture with several types, but the resin used in the present invention is not limited to these.

a) Resin having ester bonds, such as polyester resin, polyacrylic acid ester resin, polycarbonate resin, polyvinyl acetate resin, styrene acryliate resin, and vinyl toluene acrylate resin.

b) Resin having urethane bonds, such as polyurethane resin.

c) Resin having amide bonds, such as polyamide resin.

d) Resin having urea bonds, such as urea resin.

e) Other types, such as polycaprolactone resin, polystyrene resin, polyvinyl chloride and its copolymer, and polyacrylonitrile and its copolymer.

For example, as saturated polyester, Vylon 200, Vylon 290, Vylon 600 (made by Toyo Boseki Co. , Ltd. UE3600, XA6098, XA7026 (made by Unitika), TP220, TP235 (made by Nihon Gosei Co. ) may be used . There is mixed polyester of aromatic dibasic acids and glycols, aliphatic dibasic acids and glycols, and aromatic dibasic acids, ailphatic dibasic acids and glycols. As urethane resin, there are ether type urethane or ester type urethane produced from polyether or polyester having hydroxyl groups at the end of the molecules and isocyanate. Examples of resin having an amide bond are nylon, and polyamides derived from diamines having branching groups and dimer acids. Examples of compounds having a urea bond are those obtained by a reaction of diamine acid and diisocyanate, and also reaction products of urea and aldehyde. Further, a wide range of substances can be used, such as polycaprolactone and polystyrene having ester bonds, vinyl chloride and its copolymer, and polyacrylonitrile copolymer.

When a mixture composed of polyvinyl aromatic carboxylic acid ester or its copolymer to which an ester or urethane compound has been added is used together with another type of resin, it is possible to use 1 to 100 parts by weight of the resin for 100 parts by weight of the polyvinyl ester and the additive.

It is possible to add a fluorescent whitening agent and a white dye in the receiving layer 3 for the purpose of improving the whiteness of the receiving layer, enhancing the visibility of the transferred image, imparting writability to the surface of the image, and preventing retransfer of the transferred image.

As the fluorescent whitening agent, for example, many compounds sold on the market as fluorescent whitening agents, such as Ubitex OB of Ciba Geigy Co. can be used. As the white dye, titanium oxide, zinc oxide, kaolin, clay, calcium carbonate, and powdered silica may be used alone or as mixtures of two types or more. For enhancing the light resistance of the transferred image, it is possible to add into the receiving layer one or more types of ultraviolet ray absorbing agent, a light stabilizer, an antioxidant, or other additives in accordance with needs. The amounts added of the fluorescent whitening agent, white dye, ultraviolet ray absorbing agent, and light stabilizer are suitably 0.05 to 10 parts by weight for 100 parts by weight of cellulose ester resin. However, depending on the purpose, an amount outside of this range may also be added. The abovementioned amounts added are only of a single example, and therefore the invention is not limited to these amounts.

The video printing paper of the present invention may be made to contain a parting agent in the receiving layer so as to enhance the parting from the ink ribbon sheet. Examples of the parting agents are polyethylene waxes, amide waxes, solid waxes such as Teflon powder, fluorine or phosphoric acid ester surface active agents, silicone oil, and refractory silicone waxes, but silicone oil is preferred.

For instance, either an oily type or a reaction (curing) type of silicone oil can be used in accordance with purposes. Alcohol-modified silicone oil and isocyanate are mentioned as reaction (curing) type silicones. As the reaction (curing) type silicone oil, a product of reaction and curing of an epoxy-modified silicone oil (epoxy and polyester-modified silicone oil) and a carboxy-modified silicone oil (carboxy-polyether modified silicone oil), or a product of reaction and curing of an amino-modified silicone oil (amino-polyether modified silicone oil) and carboxy-modified silicone oil (carboxy-polyether modified silicone oil), is preferable. The thickness of a parting agent layer is preferably 0.01 to 5 μm, but the invention is not particularly limited to this thickness.

For suppressing generation of static electricity during the processing of the video printing paper or during its running in the printer, the video printing paper may contain an antistatic agent in a cellulose ester type receiving layer or on the surface of the receiving layer.

The antistatic agent is exemplified by a surface active agent, specifically, a cationic surface active agent such as quaternary ammonium salt and polyamine derivative, an anionic surface active agent such as alkyl benzene sulfonate and sodium salt of alkyl sulfuric acid ester, an amphoteric surface active agent, or a nonionic surface active agent.

These antistatic agents may be formed on the receiving layer by coating or may be added to the polyvinyl aromatic carboxylic acid vinyl ester or its copolymer.

On the other hand, though any dyestuff may be used for the ink ribbon, the following dyestuffs may be mentioned as specific examples.

(1) Methine based dye (A) (Macrolex Yellow 6G, made by Bayer Co.)

(2) Methine based dye (B) (Foron Brilliant Blue SR-PI, made by Sandoz Co.)

(3) Anthraquinone based dye (C) (Macrolex Red Violet R, made by Bayer Co.)

(4) Azo based dye (Sumikaron Red S-BDF, made by Sumitomo Chemical Co., Ltd.)

(5) Indoaniline based dye (E)

For instance, first, 3 g of 2-(n-butyroylamino)-4,6-dichloro-5-methylphenol is dissolved in 200 g of ethanol, to which 8 g of sodium carbonate dissolved in 100 g of water is then added, and the mixture is agitated well. Next, 5 g of 4-amino-N (β-hydroxyethyl )-N-ethyl -m-toluidine sulfate dissolved in 100 g of water is added to the above mixture, and the resulting mixture is agitated for 30 minutes. Then, 15 g of sodium hypochlorite solution is added to the mixture little by little, and when the sodium hypochlorite solution is fully added the mixture is agitated for 10 minutes. Finally, 300 g of water is added, and the resulting mixture is filtered to produce crystals of the dye.

Hereinbelow, preferred embodiments of the present invention will be explained on the basis of experiment results.

SYNTHESIS EXAMPLE 1

In the present example, benzoic acid vinyl ester was polymerized by block polymerization using 1,1'-azobis (cyclohexane-1-carbonitrile) as a catalyst.

First, 15 g of vinyl benzoate (made by Shinetsu Vinyl Acetate Co.) and 0.04 g of 1,1'-azobis (cyclohexane-1-carbonitrile) (made by Wako Pure Chemical Industries), refined by vacuum distillation at 73° to 75° C. and 3 mmhg, were set in a glass ampul of a capacity of 50 ml. The air in the ampul was replaced by nitrogen gas by a refrigeration replacement method, and then the ampul was sealed. The ampul was set in a warm water tank and heated at 70±1° C. for 15 minutes.

At this time, the content in the ampul became viscous about 15 minutes after the start of heating. About one hour later, the content became a glass-like solid with a yellowish tinge.

The ampul was heated for a predetermined time, and was then cooled down to a room temperature. The ampul was further cooled with liquid nitrogen, and was opened. Polymer synthesized in the ampul was dissolved in toluene, and was taken out. Then the toluene solution of the polymer was gradually added drop by drop into vigorously mixed methanol, thereby obtaining white powdery polymer. The yield of the polymer at this time was 98 percent.

The polymer obtained in this manner was studied as to the compatibility and softening point, and as to the molecular weight by infrared absorption spectroanalysis and gel filtration chromatography. The results of the studies are described as follows.

First, the result of studying the compatibility of the polymer shows that the polymer was dissolved in toluene, cyclohexanone, dioxane, methylcellosolve, ethyl acetate, and tetrahydrofuran, but was insoluble or difficult to be dissolved in methanol, isopropanol, n-hexane, and cyclohexane.

The polymer was dissolved in tetrahydrofuran, and was then made into a transparent film. The melting point of the polymer film was measured by a microscope equipped with a heating plate. The film started to melt gradually at around 84° C. and completely melted at around 93° C. Accordingly, it turned out that the polymer had the softening point at around 80° C.

Figure 2:
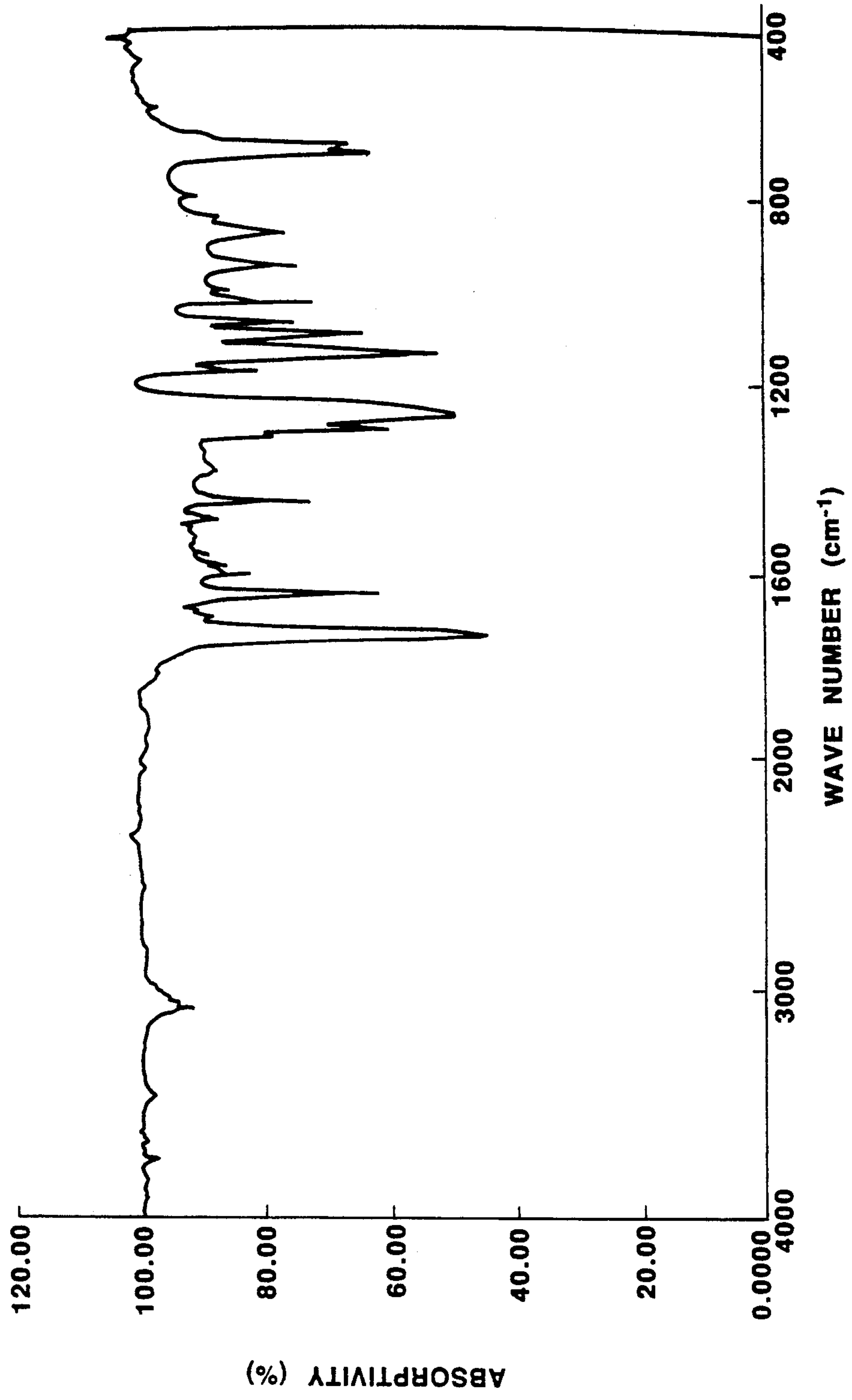
FIG. 2 is a graph showing an infrared absorption spectrum of benzoic acid vinyl ester (monomer).
Figure 3:
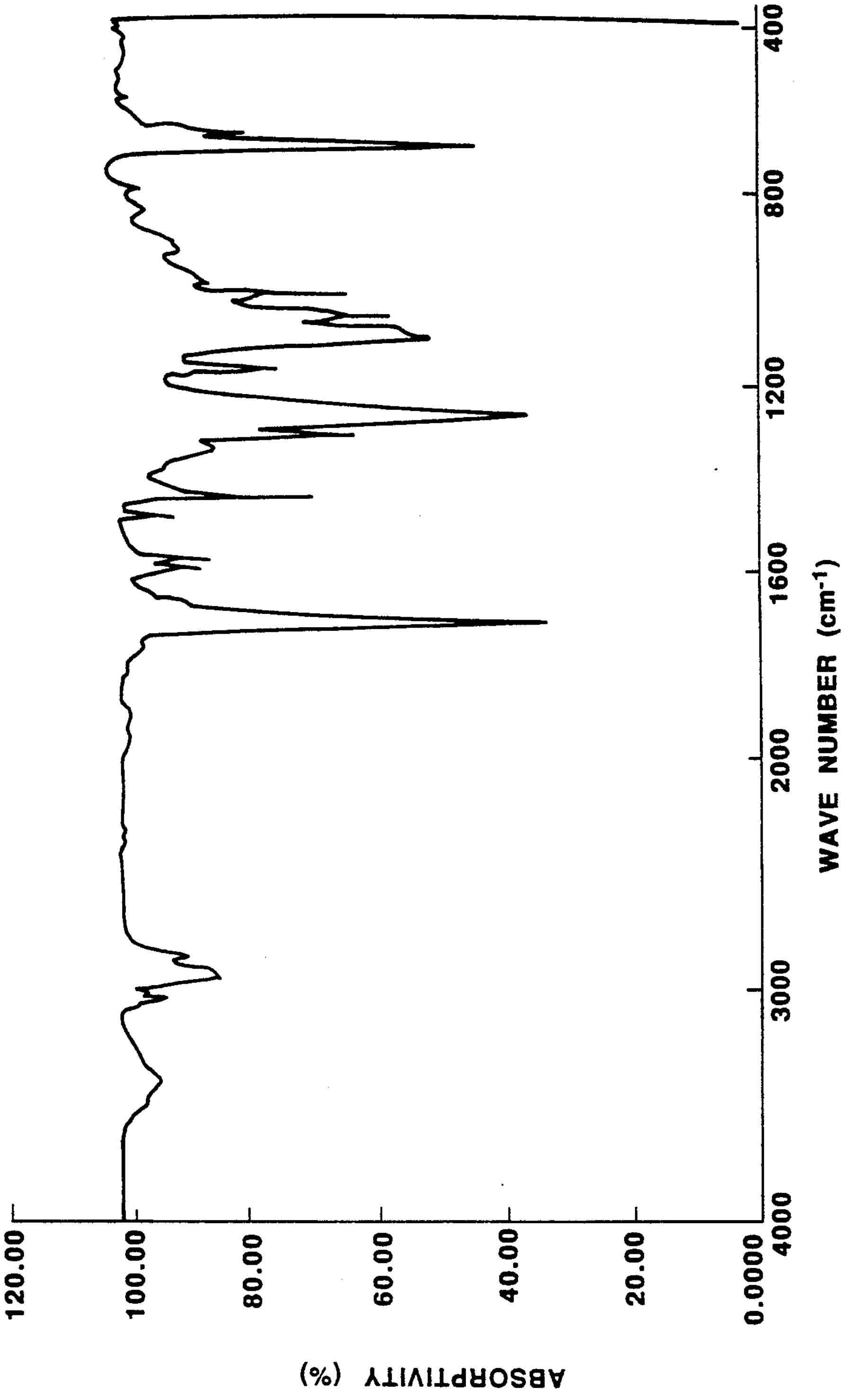
FIG. 3 is a graph showing an infrared absorption spectrum of polyvinyl aromatic carboxylic acid ester.

Next, infrared absorption spectroanalysis was carried out on the polymer film. FIGS. 2 and 3 show an infrared absorption spectrum of polybenzoic acid vinyl ester or monomer, and an infrared absorption spectrum of the polymer film, respectively.

From the results of the infrared absorption spectroanalysis, as found by comparing FIGS. 2 and 3, the infrared absorption spectrum of the polymer film coincided well with the infrared absorption spectrum of the monomer except for disappearance of peaks at 1500 to 1575 $cm^{-1}$, 1616 to 1698 $cm^{-1}$, 847 $cm^{-1}$, 875 $cm^{-1}$, and 948 $cm^{-1}$, observed in the infrared absorption spectrum of the monomer and believed to show absorption of the vinyl group. On the basis of this fact, it was confirmed that the synthesized polymer was polybenzoic acid vinyl ester.

Figure 4:
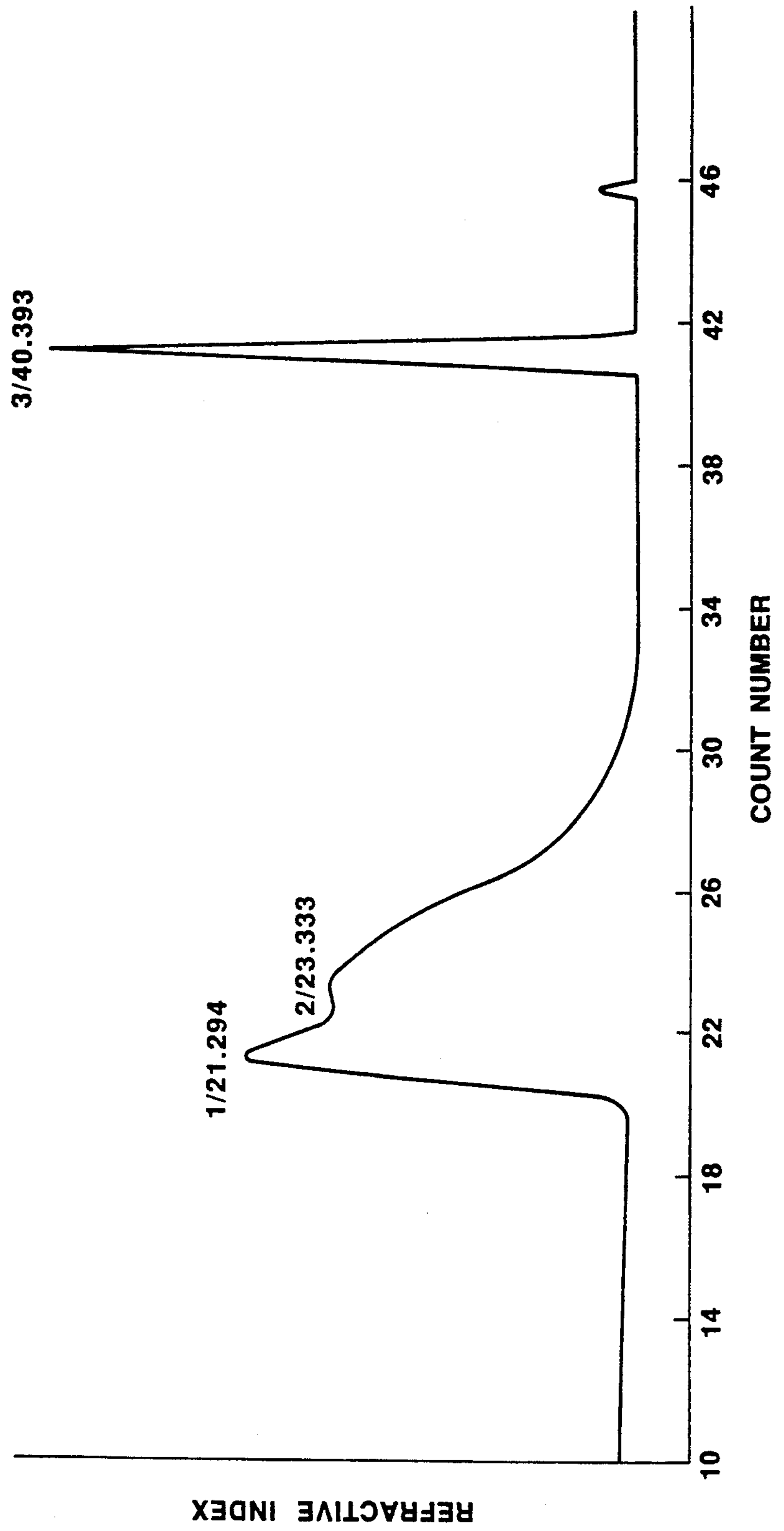
FIG. 4 shows an elution pattern of gel filtration chromatography of the polymer.

In addition, gel filtration chromatography was carried out on a tetrahydrofuran solution of the polymer. The molecular weight, degree of polymerization, and distribution of molecular weight of the obtained peak fractions were examined. FIG. 4 shows an elution pattern in the gel filtration chromatography, and Table 1 shows the molecular weight, polymerization degree, and distribution of molecular weight of the eluted polymer.

Meanwhile, polystyrene was used as a standard sample for measuring molecular weight. In Table 1, the polymerization degree and distribution of molecular weight are calculated from number average molecular weight/molecular weight of monomer and weight average molecular weight/number average molecular weight, respectively.

TABLE 1

| Fraction | Number average molecular weight | Polymerization degree | Weight average molecular weight | Z average molecular weight | Distribution of molecular weight |
|---|---|---|---|---|---|
| 1 | 443000 | 2990 | 481000 | 522000 | 1.09 |
| 2 | 61000 | 412 | 120000 | 164000 | 1.97 |

The resulting polymer exhibited a polymerization degree of approximately 3000, which is extremely high, and had a narrow distribution of molecular weight and high uniformity of molecular weight, as shown in Table 1.

Accordingly, it turned out from the above results that if 1,1'-azobis (cyclohexane-1-carbonitrile) is used as a catalyst for polymerizing benzoic acid vinyl ester, polybenzoic acid vinyl ester having a high polymerization degree and uniform molecular weight can be obtained with high yield. Since the resulting polymer had a high softening point, that is approximately 80° C., it turned out that the polymer is suitable for a material required to have film formation performance, such as an adhesive and a receiving layer material of printing paper.

SYNTHESIS EXAMPLE 2

In this example, benzoic acid vinyl ester was polymerized by block polymerization using 4,4'-azobis (4-cyano-valeric acid) as a catalyst.

The benzoic acid vinyl ester was polymerized in the same manner as Synthesis Example 1 except for the use of 4,4'-azobis (4-cyano-valeric acid). Meanwhile, when 4,4'-azobis (4-cyanovaleric acid) was used, gel-like substance insoluble in toluene was formed in melting the content of the ampul into toluene after polymerization. However, the insoluble substance was separated by filtration, and soluble substance alone was taken out for use in the next process. At this time, the yield of the polymer was 70 percent.

The resulting polymer was studied as to the compatibility and softening point, and as to the molecular weight by infrared absorption spectroanalysis and gel filtration chromatography, in the same manner as in Synthesis Example 1.

an infrared absorption spectrum of the polymer, and an elution pattern of gel filtration chromatography, respectively. Table 2 shows the molecular weight, polymerization degree, and distribution of molecular weight of the eluted polymer. 8c

TABLE 2

| Fraction | Number average molecular weight | Polymerization degree | Weight average molecular weight | Z average molecular weight | Distribution of molecular weight |
|---|---|---|---|---|---|
| 1 | 416000 | 2811 | 481000 | 501000 | 1.15 |
| 2 | 71000 | 480 | 211000 | 364000 | 2.97 |

First, the result of studying the compatibility of the polymer shows that the polymer was dissolved in toluene, cyclohexanone, dioxane, methylcellosolve, ethyl acetate, and tetrahydrofuran, but was insoluble or difficult to be dissolved in methanol, isopropanol, n-hexane, and cyclohexane.

The polymer was dissolved in tetrahydrofuran, and was then made into a transparent film. The melting point of the polymer film was measured by a microscope equipped with a heating plate. The film started to melt gradually at around 84° C. and completely melted at around 97° C. Accordingly, it turned out that the polymer had the softening point at around 80° C.

Figure 5:
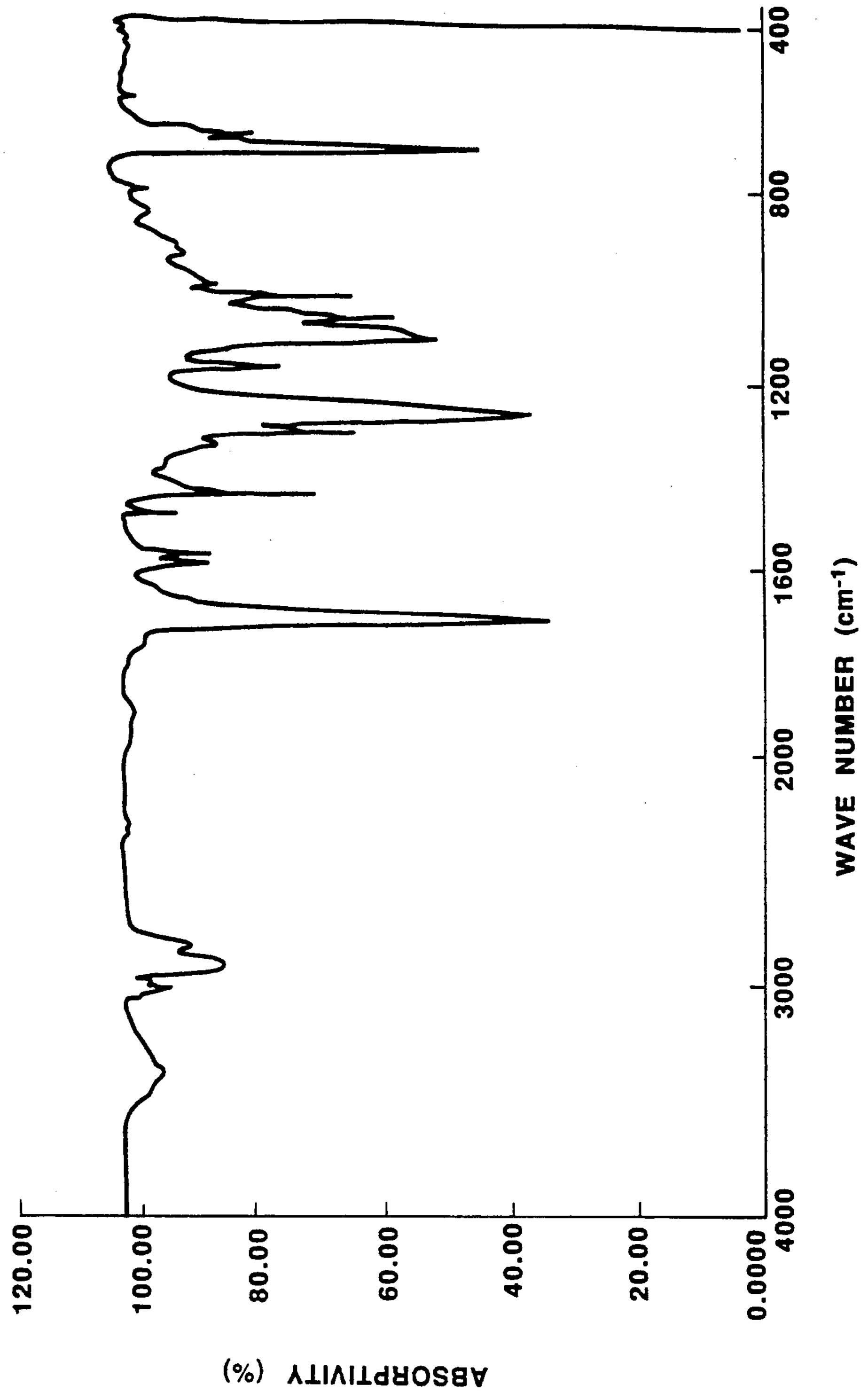
FIG. 5 is a graph showing an infrared absorption spectrum of polymer obtained when 1,1'-azobis (cyclohexane-1-carbonitrile) is used as a catalyst.
Figure 6:
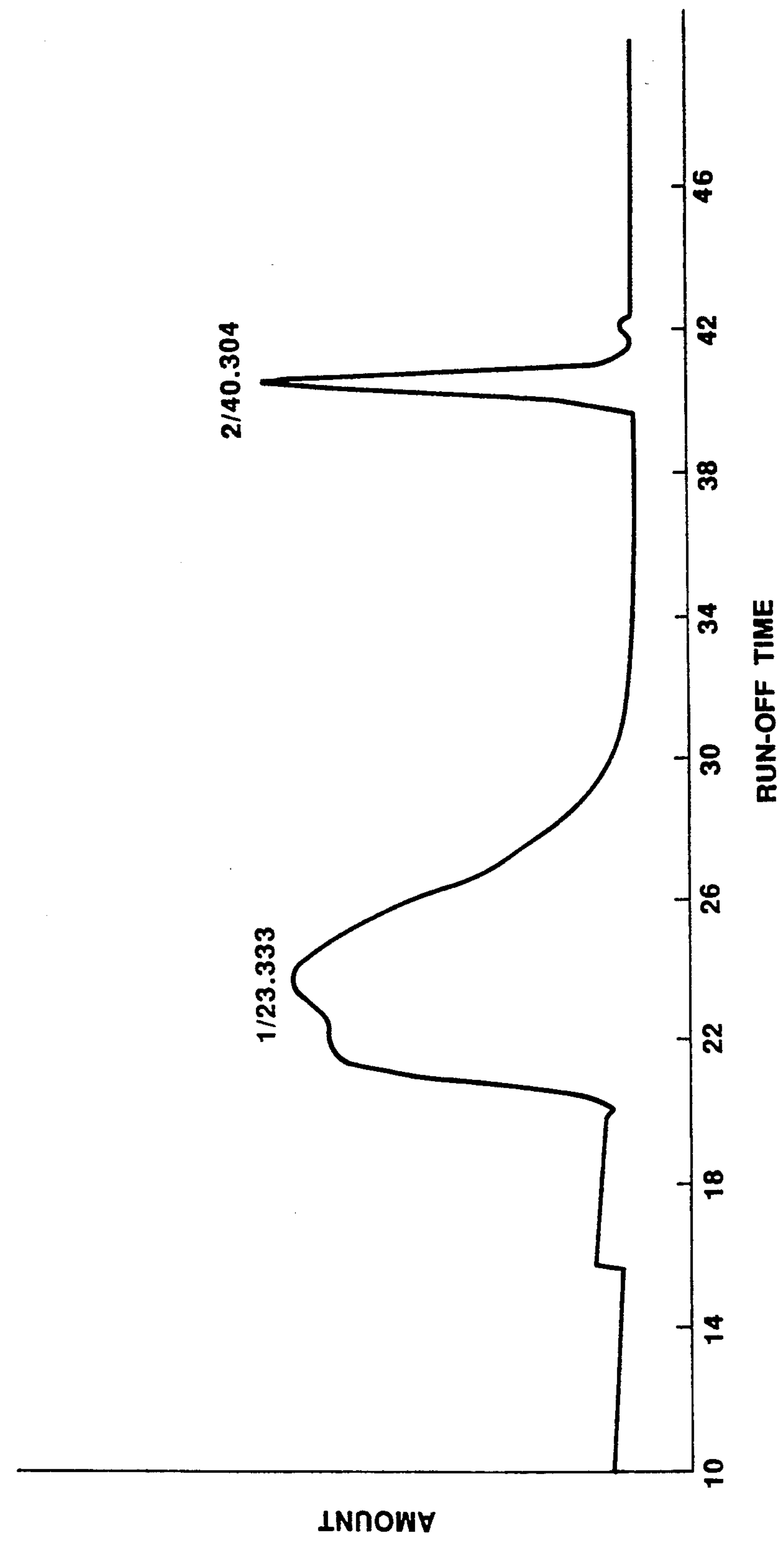
FIG. 6 shows an elution pattern of gel filtration chromatography of the polymer obtained when 1,1'-azobis (cyclohexane-1-carbonitrile) is used as a catalyst.
Figure 7:
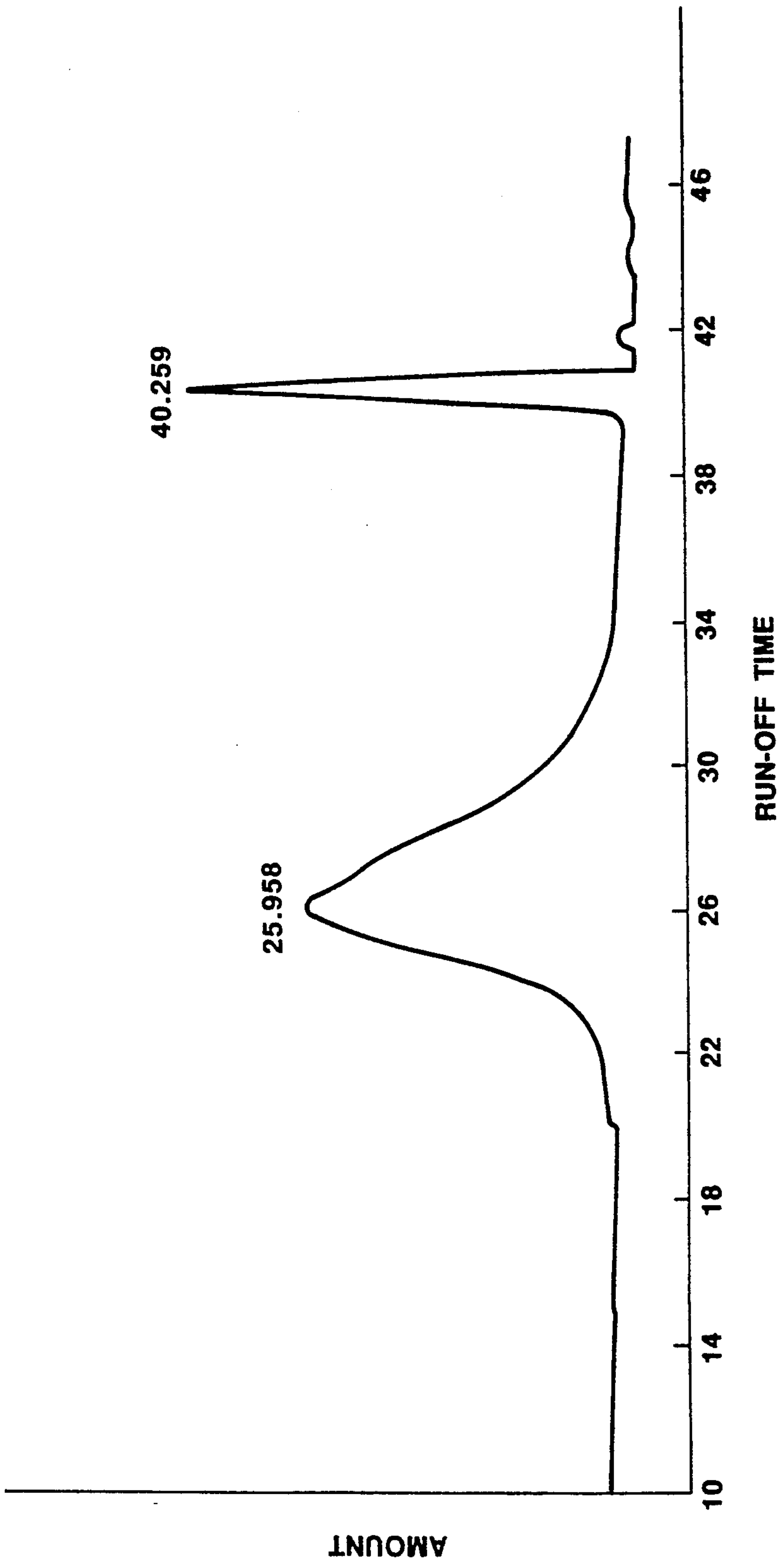
FIG. 7 shows an elution pattern of gel filtration chromatography of a polymer obtained when 4,4'-azobis (4-cyanovaleric acid) is used as a catalyst.

From the results of the infrared absorption spectroanalysis, as learned by comparing FIGS. 2 and 5, the infrared absorption spectrum of the polymer film coincided well with the infrared absorption spectrum of the monomer except for disappearance of peaks observed in the infrared absorption spectrum of the monomer and believed to show absorption of the vinyl group. On the basis of this fact, it was confirmed that the synthesized polymer was polybenzoic acid vinyl ester.

The resulting polymer exhibited a polymerization degree of approximately 3000, which is extremely high, and had a narrow distribution of molecular weight and high uniformity of molecular weight, as shown in Table 2.

Accordingly, it turned out from the above results that if 4,4'-azobis (4-cyano-valeric acid) is used as a catalyst for polymerizing benzoic acid vinyl ester, polybenzoic acid vinyl ester having a high polymerization degree and uniform molecular weight can be obtained with high yield. Since the resulting polymer had a high softening point, that is approximately 80° C., it also turned out that the polymer is suitable for a material required to have film formation performance, such as an adhesive and a receiving layer material of printing paper.

COMPARATIVE EXAMPLE 1

In this example, catalysts other than 1,1'-azobis (cyclohexane-1-carbonitrile) and 4,4'-azobis (4-cyano-valeric acid) were used for comparison. Benzoic acid vinyl ester was polymerized in the same manner as in Synthesis Example 1 except for the use of catalysts shown in Table 3, and the molecular weight, polymerization degree, and distribution of molecular weight of the resulting polymer were examined. The results are shown in Table 3. The yield of the polymers is also shown in Table 3.

TABLE 3

TABLE 3

| Catalyst | Yield (%) | Number average molecular weight | Polymerization degree | Weight average molecular weight | Distribution of molecular weight |
|---|---|---|---|---|---|
| 2,2'-azobis isobutyronitrile | 59 | 23000 | 155 | 55000 | 2.39 |
| 2,2'-azobis (2,4-dimethyl valeronitrile) | 77 | 34000 | 230 | 80000 | 2.35 |
| 2,2'-azobis (2-amidinopropane) carbonate | 0 | — | — | — | — |
| 2,2'-azobis [2-methyl-N-(2-hydroxyethyl)] propionic acid | 70 | 29000 | 196 | 65000 | 2.41 |
| 2,2'-azobis (2,4,4-trimethyl | 45 | 30000 | 203 | 79000 | 2.63 |

TABLE 3-continued

| Catalyst | Yield (%) | Number average molecular weight | Polymerization degree | Weight average molecular weight | Distribution of molecular weight |
|---|---|---|---|---|---|
| pentane) | | | | | |
| 2,2'-azobis (2-hydroxy-methyl propylnitrile) | 82 | 36000 | 243 | 80000 | 2.22 |
| dimethyl 2,2'-azobis (2-methyl propionate) | 98 | 18000 | 122 | 58000 | 3.22 |
| benzoyl peroxide* | 98 | 43000 | 291 | 139000 | 3.23 |

*A product sold on the market:benzoyl peroxide/dioctylphthalate (1/1) paste

For each of the synthesized types of polymer, the polymerization degree was low, and the distribution of molecular weight was wide, as seen from Table 3. Accordingly, it turned out that when catalysts other than 1,1'-azobis (cyclohexane-1-carbonitrile) and 4,4'-azobis (4-cyano-valeric acid) are used, sufficient polymerization activity cannot be obtained.

SYNTHESIS EXAMPLE 3

In this example, various types of aromatic carboxylic acid vinyl ester were polymerized by block polymerization using 1,1'-azobis (cyclohexane-1-carbonitrile) as a catalyst.

Polymerization was carried out in the same manner as in Example 1 except for the use of aromatic carboxylic acid vinyl ester shown in Table 4 as monomer, and the molecular weight, polymerization degree, and distribution of molecular weight were examined. The results are shown in Table 4. Meanwhile, for polymer 3 to polymer 7, when there were a plural peaks in an elution pattern of gel filtration chromatography, a peak of the highest molecular weight alone was examined. The yield of each type of polymer was 80 to 95 percent.

TABLE 4

| Monomer | | Number average molecular weight | Polymerization degree | Weight average molecular weight | Distribution of molecular weight |
|---|---|---|---|---|---|
| Vinyl poly-p-tert-butyl benzoate ester | Fraction 1 | 458000 | 2250 | 528000 | 1.07 |
| | Fraction 2 | 164000 | 804 | 199000 | 1.10 |
| Vinyl o-toluate | | 439000 | 2710 | 480000 | 1.09 |
| Vinyl p-toluate | | 462000 | 2852 | 510000 | 1.10 |
| Vinyl 1-naphthoate | | 320000 | 1616 | 490000 | 1.53 |
| Vinyl p-phenyl benzoate | | 399000 | 1781 | 475000 | 1.19 |
| Vinyl p-chloro benzoate | | 210000 | 1151 | 410000 | 1.95 |

The resulting polymer had a high polymerization degree and a narrow distribution of molecular weight. Accordingly, it was shown that effects of 1,1'-azobis (cyclohexane-1-carbonitrile) were exhibited similarly for any aromatic carboxylic acid used as monomer, as shown in Table 4.

Polyvinyl p-tert-butyl benzoate (glass-like hard polymer) was studied as to the compatibility, and consequently it turned out that polyvinyl p-tert-butyl benzoate is soluble in tetrahydrofuran, toluene, and cyclohexanone. When synthetic paper (made by Oji Yuka Co., brand name Yupo FPG-150) was coated with an 8-percent cyclohexanone solution of the polymer, the film surface was smooth and glossy, and printing was possible on the surface.

SYNTHESIS EXAMPLE 4

In this example, various types of aromatic carboxylic acid vinyl ester were polymerized by block polymerization using 4,4'-azobis (4-cyano-valeric acid) as a catalyst.

Polymerization was carried out in the same manner as in Example 1 except for the use of aromatic carboxylic acid vinyl ester shown in Table 5 as monomer. In most cases, the polymer was synthesized, containing insoluble gel-like substance. For studying the molecular weight and other elements, soluble parts of tetrahydrofuran were used. For polymer 3 to polymer 7, if there were a plural peaks in an elution pattern of gel filtration chromatography, a peak of the highest molecular weight alone was examined. The yield of each type of polymer was 65 to 80 percent.

TABLE 5

| Monomer | | Number average molecular weight | Polymerization degree | Weight average molecular weight | Distribution of molecular weight |
|---|---|---|---|---|---|
| Vinyl o- | Fraction | | | | |

TABLE 5-continued

| Monomer | | Number average molecular weight | Polymerization degree | Weight average molecular weight | Distribution of molecular weight |
|---|---|---|---|---|---|
| toluate | 1 | 495000 | 2698 | 495000 | 1.13 |
| | 2 | 220000 | 1210 | 220000 | 1.12 |
| | 3 | 64000 | 364 | 64000 | 1.08 |
| | 4 | 19000 | 86 | 19000 | 1.36 |
| Vinyl p-toluate | | 419000 | 2856 | 516000 | 1.23 |
| Vinyl l-naphthoate | | 260000 | 1313 | 344000 | 1.32 |
| Vinyl p-phenyl benzoate | | 338000 | 1590 | 409000 | 1.21 |
| Vinyl p-chloro benzoate | | 185000 | 1014 | 235000 | 1.27 |
| Vinyl poly-p-tert-butyl benzoate | | 417000 | 2044 | 475000 | 1.14 |

The resulting polymer had a high polymerization degree and a narrow distribution of molecular weight. Accordingly, it was shown that effects of 4,4'-azobis (4-cyano-valeric acid) were exhibited similarly for any aromatic carboxylic acid used as monomer, as shown in Table 5.

Polyvinyl o-toluic acid ester was studied as to the compatibility, and consequently it turned out that polyvinyl o-toluic acid ester is soluble in tetrahydrofuran, toluene, and cyclohexanone, and insoluble in methanol and ethanol. A film obtained from a tetrahydrofuran solution of the polymer was colorless, transparent, and elastic. The film was melted by heating to adhere to paper, metals such as aluminum and iron, and plastics such as polyethylene terephthalate. The polymer with which synthetic paper (made by Oji Yuka Co., brand name Yupo FPG-150) was laminated could be used for general printing.

SYNTHESIS EXAMPLE 5

In this example, benzoic acid vinyl ester was polymerized by solution polymerization using 1,1'-azobis (cyclohexane-1-carbonitrile) as a catalyst.

First, a stirrer, a backflow cooler, a thermometer, and a nitrogen gas introduction tube were set. Then, 25 g of benzoic acid vinyl, 200 g of special grade reagent cyclohexane, and 0.125 g of 1,1'-azobis (cyclohexane-1-carbonitrile), refined by vacuum distillation, were prepared in a four-neck flask with a capacity of 500 ml set in a water tank in advance. With nitrogen gas introduced into the flask with a flow rate of 100 ml/min., the mixture was stirred. The flask was heated at such a heating rate that the temperature of the content became 80° C. by 30-minute heating.

30 minutes after the temperature of the content reached the target temperature, the content started to become whitely turbid. About one hour later, semi-transparent white gel-like substance was adhered to flask walls.

Further, the flask was continuously heated for four hours, and was then cooled. After the content was cooled to a room temperature, the content was vigorously stirred while 100 ml of methyl alcohol was added into the flask drop by drop, thereby obtaining white powdery insoluble substance. The content in the flask was filtered, so that insoluble substance was separately taken out. The insoluble substance was washed with methyl alcohol several times, and then was dried by vacuum desiccation, that is, at 10 mmHg and 60° C. for 24 hours, thereby obtaining polymer.

The polymer thus obtained was studied as to the compatibility, and as to the molecular weight by infrared absorption spectroanalysis and gel filtration chromatography. Meanwhile, the yield of the polymer was 23.5 g.

Table 6 shows the molecular weight, polymerization degree, and distribution of molecular weight of the polymer eluted by gel filtration chromatography.

TABLE 6

| Fraction | Number average molecular weight | Polymerization degree | Weight average molecular weight | Distribution of molecular weight |
|---|---|---|---|---|
| 1 | 94000 | 635 | 116000 | 1.23 |
| 2 | 19000 | 128 | 27000 | 1.41 |

First, as to the compatibility of the polymer, it turned out that the polymer is soluble in tetrahydrofuran, cyclohexanone, and toluene.

From the infrared absorption spectroanalysis, it was confirmed that the resulting polymer was polyvinyl benzoic acid ester.

In addition, the resulting polymer had a high polymerization degree and narrow distribution of molecular weight, as shown in Table 6. Accordingly, it turned out from these results that 1,1'-azobis (cyclohexane-1-carbonitrile) exhibits good catalytic effects in both block polymerization and solution polymerization.

SYNTHESIS EXAMPLE 6

In this example, benzoic vinyl ester was polymerized by solution polymerization using 4,4'-azobis (4-cyano-valeric acid) as a catalyst.

The benzoic vinyl ester was polymerized by solution polymerization in the same manner as in Synthesis Example 5 except for the use of 4,4'-azobis (4-cyano-valeric acid) as the catalyst. The resulting polymer was studied as to the compatibility and as to the molecular weight by infrared absorption spectroanalysis and gel filtration chromatography. The yield of the polymer was 23.5 g.

Table 7 shows the molecular weight, polymerization degree, and distribution of molecular weight of the polymer eluted by gel filtration chromatography.

TABLE 7

| Fraction | Number average molecular weight | Polymerization degree | Weight average molecular weight | Distribution of molecular weight |
|---|---|---|---|---|
| 1 | 88600 | 599 | 105000 | 1.19 |
| 2 | 23000 | 155 | 27000 | 1.17 |

First, as to the compatibility of the polymer, it turned out that the polymer is soluble in tetrahydrofuran, cyclohexanone, and toluene.

From the infrared absorption spectroanalysis, it was confirmed that the resulting polymer was polyvinyl benzoic acid ester.

Further, the resulting polymer had a high polymerization degree and narrow distribution of molecular weight. Accordingly, it turned out from these results that 4,4'-azobis (4-cyano valeric acid) exhibits good catalytic effects in both block polymerization and solution polymerization.

COMPARATIVE EXAMPLE 2

For comparison, benzoic acid vinyl ester was polymerized by solution polymerization using 2,2'-azobis isobutylonitrile, which is a general azo based polymerization catalyst.

The benzoic acid vinyl ester was polymerized by solution polymerization in the same manner as in Example 4 except for the use of 2,2'-azobis isobutylonitrile as the catalyst. The synthesized polymer was studied as to the molecular weight by gel filtration chromatography in the same manner as in Example 1.

FIG. 8 shows an elution pattern of the gel filtration chromatography. Table 8 shows the molecular weight, polymerization degree, and distribution of molecular weight of the eluted polymer.

TABLE 8

| Catalyst | Number average molecular weight | Polymerization degree | Weight average molecular weight | Distribution of molecular weight |
|---|---|---|---|---|
| 2,2'-azoisobutyronitrile | 7700 | 52 | 11700 | 1.52 |

The resulting polymer had a low polymerization degree and wide distribution of molecular weight. Thus, it was learned that when 2,2'-azobis isobutylonitrile is used, good polymer cannot be obtained in solution polymerization, either.

PREPARATION OF RECEIVING LAYER SHEET

A receiving layer sheet was prepared by coating synthetic paper (made by Oji Yuka Co. , brand name FPG-150) having a thickness of 150 μm with a receiving layer composition of the following composition to give a dried thickness of 10 μm, and then curing for 48 hours at 50° C. The composition of the receiving layer is shown below. Note that types of the polyvinyl aromatic carboxylic acid ester or its copolymer used in the various sheets are shown in Tables 9 and 10.

RECEIVING LAYER COMPOSITION

Polyvinyl aromatic carboxylic acid ester or its copolymer: 20.0 parts by weight

Isocyanate (made by Takeda Chemical Industries Co., brand name Takenate D-110N): 1.0 part by weight Modified silicone oil (made by Toray Dow Corning Co., brand name SF8427): 0.6 parts by weight Fluoroscent whitening agent (made by Ciba Geigy Co., brand name Ubitex OB): 0.04 parts by weight Methylethylketone: 40.0 parts by weight

INK RIBBONS USED IN TESTS

Y: Yellow (print material ribbon VPM-30ST, made by Sony Corporation)

M: Magenta (print material ribbon VPM-30ST, made by Sony Corporation)

C: Cyan (print material ribbon VPM-30ST, made by Sony Corporation)

The method of preparing the ink ribbons used was as follows:

| Ink layer composition | |
|---|---|
| Dyestuff: | 3.70 parts by weight |
| Ethylhydroxyethylcellulose (EHEC-LOW, made by Hercules Co.): | 7.42 parts by weight |
| Toluene: | 44.44 parts by weight |
| Methylethylketone: | 44.44 parts by weight |

The ink was prepared by stirring a mixture of the above composition. Then, a polyethylene terephthalate (PET) film with a thickness of 6 μm treated on its back surface with a coil bar was coated with the ink layer composition so as to give a dried thickness of about 1 μm, thereby preparing a sublimating-type transfer sheet, which was used as an ink sheet.

HEAT TRANSFER RECORDING

Heat transfer recording was carried out by 12-gradation stair step printing of the ink sheet and the receiving layer sheet, using a color video printer (made by Sony Corporation, brand name CVP-G500).

LIGHT RESISTANCE TEST

The receiving layer sheet on which gradation printing was carried out was irradiated with 60,000 $KJ/m^2$ with a xenon arc fadometer (made by Gas Shikenki Co. The density before and after the irradiation was measured by using a Macbeth reflection densitometer (TR-924) at a maximum density portion and a gradation portion near density of 1.0. The residual rate of the dyestuff was calculated by the following formula.

Residual rate of dyestuff (%)=Density after xenon irradiation/Density before xenon irradiation×100

DARK FADING TEST

The receiving layer sheet on which gradation printing was carried out was held in a constant-temperature constant-humidity tank (made by Tabai) at 65° C. and 85 percent relative humidity for 10 days, and then a change in density before and after the test at the maximum density portion and the portion near the density of 1.0 was measured by using the Macbeth reflection densitometer (TR-924). The residual rate of the dyestuff was calculated by the following formula:

Residual rate of dyestuff (%)=Density after test Density before test×100

MEASUREMENT OF DYE CONCENTRATION

The maximum density portion on the receiving layer sheet on which gradation printing was carried out was measured by a Macbeth reflection densitometer (TR-924).

The results of the measurement are shown in Tables 9 and 10 with the types of the polymer used.

TABLE 9

Polymer Composition of Receiving Layer and Image Printing Performance

| Synthesis*4 method | Polymer Composition | Color | Max. dye density | Light resistance test Max. density | Light resistance test Density 1.0 | Dark fading test Max. density | Dark fading test Density 1.0 |
|---|---|---|---|---|---|---|---|
| 1 | Vinyl benzoate | Y*6 | 2.39 | 80.4 | 62.5 | 100.0 | 91.2 |
| | | M*6 | 2.06 | 79.5 | 70.3 | 90.1 | 86.6 |
| | | C*6 | 2.01 | 69.0 | 58.2 | 85.6 | 78.3 |
| 1 | Vinyl p-tert-butyl benzoate | Y | 2.29 | 73.3 | 45.0 | 100.0 | 96.2 |
| | | M | 1.96 | 69.4 | 60.0 | 100.0 | 97.0 |
| | | C | 1.80 | 47.2 | 35.0 | 99.4 | 100.0 |
| 2 | Vinyl benzoate | Y | 2.38 | 79.9 | 60.3 | 100.0 | 95.5 |
| | | M | 2.18 | 73.6 | 69.3 | 97.6 | 71.5 |
| | | C | 2.10 | 69.0 | 56.4 | 90.5 | 89.6 |
| 2 | Vinyl o-methyl benzoate | Y | 2.30 | 76.4 | 50.3 | 100.0 | 100.0 |
| | | M | 1.99 | 70.2 | 61.3 | 100.0 | 100.0 |
| | | C | 1.64 | 50.0 | 41.1 | 96.5 | 100.0 |
| 2 | Vinyl benzoate/vinyl acetate (8:2)*5 | Y | 2.63 | 82.0 | 52.9 | 100.0 | 84.0 |
| | | M | 2.20 | 84.3 | 76.7 | 100.0 | 99.0 |
| | | C | 2.08 | 70.2 | 49.3 | 98.3 | 100.0 |
| 2 | Vinyl benzoate/vinyl butyrate (8:2) | Y | 2.58 | 82.3 | 61.0 | 100.0 | 100.0 |
| | | M | 2.21 | 86.8 | 83.3 | 100.0 | 100.0 |
| | | C | 2.11 | 66.9 | 56.5 | 93.3 | 100.0 |
| 2 | Vinyl benzoate/vinyl pivalate (8:2) | Y | 2.35 | 84.5 | 78.0 | 90.4 | 100.0 |
| | | M | 2.04 | 86.3 | 85.9 | 100.0 | 100.0 |
| | | C | 1.92 | 68.3 | 65.4 | 94.0 | 98.9 |
| 2 | p-methylbenzoic acid/vinyl propionate (8:2) | Y | 2.09 | 80.4 | 69.5 | 90.4 | 90.1 |
| | | M | 1.94 | 88.1 | 84.0 | 98.8 | 95.6 |
| | | C | 1.64 | 63.9 | 61.5 | 96.2 | 96.7 |
| 2 | Vinyl benzoate/vinyl butyrate (7:3) | Y | 2.33 | 78.2 | 66.9 | 88.7 | 96.4 |
| | | M | 2.14 | 83.2 | 80.8 | 79.5 | 79.2 |
| | | C | 1.77 | 60.6 | 58.0 | 63.6 | 67.3 |
| 2 | o-methylbenzoic acid/vinyl crotonate (9:1) | Y | 1.76 | 66.9 | 60.5 | 82.5 | 87.7 |
| | | M | 1.38 | 73.6 | 70.5 | 84.9 | 89.6 |
| | | C | 1.11 | 47.5 | 48.1 | 87.8 | 86.3 |
| 2 | Vinyl benzoate/monochloro-acetic acid (9:1) | Y | 2.39 | 80.0 | 78.3 | 83.0 | 100.0 |
| | | M | 2.06 | 83.6 | 73.5 | 94.2 | 94.0 |
| | | C | 1.71 | 63.0 | 63.6 | 94.5 | 93.3 |

TABLE 10

Polymer Composition of Receiving Layer and Image Printing Performance

| Synthesis method | Polymer Composition | Color | Max. dye density | Light resistance test Max. density | Light resistance test Density 1.0 | Dark fading test Max. density | Dark fading test Density 1.0 |
|---|---|---|---|---|---|---|---|
| 2 | Vinyl p-tert-butyl benzoate/monochloro-acetic acid (8:2) | Y | 2.21 | 75.4 | 70.4 | 100.0 | 100.0 |
| | | M | 2.00 | 80.2 | 71.1 | 98.0 | 97.0 |
| | | C | 1.64 | 59.1 | 40.2 | 96.0 | 97.0 |
| 2 | Vinyl o-chloro benzoate | Y | 2.60 | 71.7 | 52.7 | 82.3 | 77.8 |
| | | M | 2.24 | 74.3 | 65.7 | 92.8 | 94.2 |
| | | C | 2.08 | 57.4 | 39.3 | 100.0 | 95.5 |
| 2 | Vinyl benzoate/styrene (8:2) | Y | 2.20 | 80.8 | 54.9 | 100.0 | 100.0 |
| | | M | 1.93 | 75.4 | 66.3 | 98.8 | 99.5 |
| | | C | 1.74 | 62.2 | 51.2 | 97.0 | 99.8 |
| 3 | Vinyl benzoate (Gosenol AH-17)*7 | Y | 2.38 | 79.6 | 52.0 | 95.4 | 96.2 |
| | | M | 2.20 | 73.5 | 69.1 | 98.1 | 96.9 |
| | | C | 2.15 | 68.4 | 45.2 | 89.3 | 98.5 |
| 3 | Vinyl benzoate (Gosenol M-300)*7 | Y | 2.63 | 79.4 | 50.4 | 91.5 | 98.5 |
| | | M | 2.21 | 75.5 | 68.0 | 98.8 | 96.3 |
| | | C | 2.19 | 61.0 | 43.4 | 99.1 | 97.1 |
| 3 | Vinyl o-methyl benzoate (Gosenol GM-17)*9 | Y | 2.34 | 75.5 | 70.3 | 95.0 | 99.0 |
| | | M | 2.01 | 66.4 | 67.1 | 93.2 | 81.7 |
| | | C | 1.73 | 59.0 | 50.9 | 81.9 | 84.3 |
| 3 | Vinyl p-methyl benzoate (Gosenol KH-20) | Y | 2.33 | 85.2 | 77.8 | 99.2 | 98.9 |
| | | M | 2.09 | 74.4 | 65.8 | 90.9 | 91.2 |
| | | C | 1.51 | 63.4 | 58.4 | 92.8 | 90.2 |
| | Comparative example 1*8 | Y | 1.34 | 39.2 | 21.5 | 74.3 | 75.0 |
| | | M | 1.11 | 50.4 | 30.8 | 98.5 | 81.4 |
| | | C | 0.92 | Color loss | Color loss | 83.2 | 80.5 |
| | Comparative example 2*9 | Y | 1.56 | 45.8 | 30.1 | 76.0 | 71.0 |
| | | M | 1.45 | 59.3 | 26.5 | 89.3 | 76.4 |
| | | C | 1.01 | 38.1 | Color | 81.0 | 68.5 |

-continued

| Synthesis method | Polymer Composition | Color | Max. dye density | Light resistance test: Max. density | Light resistance test: Density 1.0 | Dark fading test: Max. density | Dark fading test: Density 1.0 |
|---|---|---|---|---|---|---|---|
| | | | | | loss | | |

*4 1: Synthesized in accordance with bulk polymerization of benzoic acid
2: Synthesized in accordance with solution polymerization of vinyl p-tert-butyl benzoate and vinyl propionate
*5 Molar ratio
*6 Polyvinyl alcohol (made by Nihon Gosei Kagaku, brand name) Gosenol AH-17 Gosenol M-300 GH-17
*7 Polyester (made by Toyo Boseki Co., Ltd., Vylon 206)
*8 Polyester (mentioned above) 20 parts + dicyclohexylphthalate 4 parts From the test results shown in the table, it is found that if polyaromatic carboxylic acid ester or its copolymer is used instead of the conventionally used polyester resin as in Comparative Examples 1 and 2, the following effects can be obtained. That is, the dyeing property is improved, and the residual rate of the dyestuff after a light resistance and fading test is high. Also, the light resistance, fading resistance, and other aspects of durability are improved.

EFFECTS OF ADDING ESTER COMPOUNDS AND URETHANE COMPOUNDS

The receiving layer was formed by adding various types of ester compounds and urethane compounds to polyvinyl benzoate or polyvinyl benzoate-vinyl acetate copolymer. The types and amounts added of the ester compounds and urethane compounds are as shown in Tables 11 and 12.

The ester compounds and urethane compounds added to the polymer were those sold on the market, and compounds not shown in catalogs were synthesized on order with chemical structure shown. The compounds were bought from the following firms: Tokyo Kasei Kogyo Co., Wako Pure Chemical Industries, Donin Kagaku Kenkyusho, and Aldrich Chemical Co.

TABLE 11

| Material | Example 1 | 2 | 3 | 4 | 5 | 6 | 7 | 8 | 9 | 10 |
|---|---|---|---|---|---|---|---|---|---|---|
| Polyvinyl benzoate*10 | 20 | | 20 | 20 | 20 | | | 20 | | |
| Vinyl benzoate-vinyl butyrate copolymer*10 | | 20 | | | | 20 | 20 | | 20 | 20 |
| Diphenyl phthalic acid ester (reagent, made by Tokyo Kasei Kogyo Co.) | | | 6 | | | | | | | |
| Dicyclohexyl phthalic acid ester (reagent, made by Tokyo Kasei Kogyo Co.) | | | | 5 | | | | | | |
| Triphenyl phosphoric acid ester (reagent, made by Tokyo Kasei Kogyo Co.) | | | | | 5 | | | | | |
| Catechol dibenzoic acid ester (reagent, made by Tokyo Kasei Kogyo Co.) | | | | | | 6 | | | | |
| Diethylene glycol-p-methyl benzoic ester (reagent, made by Tokyo Kasei Kogyo Co.) | | | | | | | 5 | | | |
| Tetracyclohexyl pyromellitic acid ester (reagent, made by Tokyo Kasei Kogyo Co.) | | | | | | | | 4 | | |
| Diphenyl succinic acid ester (reagent, made by Tokyo Kasei Kogyo Co.) | | | | | | | | | 5 | |
| Di-p-cresyl carbonic acid ester (reagent, made by Tokyo Kasei Kogyo Co.) | | | | | | | | | | 5 |
| Phenoxy benzoic acid butyl ester (reagent, made by Tokyo Kasei Kogyo Co.) | | | | | | | | | | |
| m-xylene dibutyl urethane (reagent, made by Tokyo Kasei Kogyo Co.) | | | | | | | | | | |
| 1,6-hexamethylene dibutyl urethane (reagent, made by Tokyo Kasei Kogyo Co.) | | | | | | | | | | |
| 4,4'-diphenymethane dioctyl urethane (reagent, made by Tokyo Kasei Kogyo Co.) | | | | | | | | | | |
| Polyester (Vylon 200, made by Toyo Boseki Co.) | | | | | | | | | | |
| Polyvinyl acetate (Coponyl, made by Sekisui Chemical Co.) | | | | | | | | | | |
| Vinyl chloride-vinyl acetate copolymer (Denkalac, made by Denki | | | | | | | | | | |

-continued

| Material | Example 1 | 2 | 3 | 4 | 5 | 6 | 7 | 8 | 9 | 10 |
|---|---|---|---|---|---|---|---|---|---|---|
| Kagaku Kogyo Co.) | | | | | | | | | | |

TABLE 12

| Material | Example 11 | 12 | 13 | 14 | 15 | 16 | 17 | Comparative example 1 | 2 |
|---|---|---|---|---|---|---|---|---|---|
| Polyvinyl benzoate*10 | | | | | 15 | 15 | 15 | | |
| Vinyl benzoate-vinyl butyrate copolymer*10 | 20 | 20 | 20 | 20 | | | | | |
| Diphenyl phthalic acid ester (reagent, made by Tokyo Kasei Kogyo Co.) | | | | | 2 | | | | |
| Dicyclohexyl phthalic acid ester (reagent, made by Tokyo Kasei Kogyo Co.) | | | | | | | | | 4 |
| Triphenyl phosphoric acid ester (reagent, made by Tokyo Kasei Kogyo Co.) | | | | | | 2 | | | |
| Catechol dibenzoic acid ester (reagent, made by Tokyo Kasei Kogyo Co.) | | | | | | | | | |
| Dietheylene glycol-p-methyl benzoic acid ester (reagent, made by Tokyo Kasei Kogyo Co.) | | | | | | | | | |
| Tetracyclohexyl pyromellitic acid ester (reagent, made by Tokyo Kasei Kogyo Co.) | | | | | | | 2 | | |
| Diphenyl succinic acid ester (reagent, made by Tokyo Kasei Kogyo Co.) | | | | | | | | | |
| Di-p-cresyl carbonic acid ester (reagent, made by Tokyo Kasei Kogyo Co.) | | | | | | | | | |
| Phenoxy benzoic acid butyl ester (reagent, made by Tokyo Kasei Kogyo Co.) | 4 | | | | | | | | |
| m-xylene dibutyl urethane (reagent, made by Tokyo Kasei Kogyo Co.) | | 5 | | | | | | | |
| 1,6-hexamethane dibutyl urethane (reagent, made by Tokyo Kasei Kogyo Co.) | | | 4 | | | | | | |
| 4,4'-diphenylmethane dioctyl urethane (reagent, made by Tokyo Kasei Kogyo Co.) | | | | 4 | | | | | |
| Polyester (Vylon 200, made by Toyo Boseki Co.) | | | | | 5 | | | 20 | 20 |
| Polyvinyl acetate (Coponyl, made by Sekisui Chemical Co.) | | | | | | 5 | | | |
| Vinyl chloride-vinyl acetate copolymer (Denkalac, made by Denki Kagaku Kogyo Co.) | | | | | | | 5 | | |

The EP image performance, such as dye concentration, light resistance, and dark fading resistance of the printing paper was measured. The results of the measurement are shown in Tables 13 to 15.

TABLE 13

Receiving Layer Composition and EP Image Performance

| Example | Color | Maximum dye density | Light resistance test Max. density | Light resistance test Density 1.0 | Dark fading test Density 1.0 |
|---|---|---|---|---|---|
| 1 | Y*1 | 2.39 | 80.4 | 62.5 | 91.2 |
| | M*1 | 2.06 | 79.5 | 70.3 | 86.6 |
| | C*1 | 2.01 | 69.0 | 58.2 | 78.3 |

-continued

| Example | Color | Maximum dye density | Light resistance test Max. density | Light resistance test Density 1.0 | Dark fading test Density 1.0 |
|---|---|---|---|---|---|
| 2 | Y | 2.58 | 82.3 | 61.0 | 100.0 |
| | M | 2.21 | 86.8 | 83.3 | 100.0 |
| | C | 2.11 | 66.9 | 56.5 | 100.0 |
| 3 | Y | 2.38 | 81.4 | 58.2 | 99.2 |
| | M | 2.20 | 82.5 | 75.1 | 99.6 |
| | C | 2.10 | 68.4 | 59.0 | 98.3 |
| 4 | Y | 2.41 | 79.4 | 65.1 | 100.0 |
| | M | 2.30 | 77.7 | 70.3 | 100.0 |
| | C | 2.05 | 69.3 | 68.2 | 98.5 |
| 5 | Y | 2.40 | 89.1 | 89.9 | 100.0 |
| | M | 2.41 | 85.3 | 86.3 | 100.0 |
| | C | 1.75 | 69.9 | 72.1 | 97.1 |
| 6 | Y | 2.40 | 73.7 | 59.1 | 100.0 |
| | M | 2.49 | 77.4 | 70.3 | 99.6 |
| | C | 2.33 | 70.4 | 69.2 | 98.4 |

-continued

| | | Maximum | Light resistance test | | Dark fading test |
|---|---|---|---|---|---|
| Example | Color | dye density | Max. density | Density 1.0 | Density 1.0 |
| 7 | Y | 2.21 | 75.3 | 65.4 | 99.2 |
| | M | 2.14 | 71.4 | 69.9 | 99.8 |
| | C | 2.09 | 70.3 | 59.2 | 93.5 |

TABLE 14

Receiving Layer Composition and EP Image Performance

| | | Maximum | Light resistance test | | Dark fading test |
|---|---|---|---|---|---|
| Example | Color | dye density | Max. density | Density 1.0 | Density 1.0 |
| 8 | Y | 2.36 | 81.5 | 72.5 | 100.0 |
| | M | 2.16 | 79.6 | 70.0 | 100.0 |
| | C | 2.11 | 70.0 | 65.1 | 99.5 |
| 9 | Y | 2.91 | 80.9 | 75.3 | 99.5 |
| | M | 2.12 | 80.4 | 73.7 | 98.2 |
| | C | 2.14 | 70.5 | 68.3 | 93.4 |
| 10 | Y | 2.38 | 86.5 | 70.3 | 96.5 |
| | M | 2.31 | 82.1 | 69.3 | 98.9 |
| | C | 2.24 | 59.1 | 63.9 | 97.2 |
| 11 | Y | 2.29 | 83.3 | 75.6 | 100.0 |
| | M | 2.15 | 81.5 | 71.2 | 100.0 |
| | C | 2.10 | 70.6 | 60.0 | 98.9 |
| 12 | Y | 2.38 | 81.5 | 55.3 | 96.2 |
| | M | 2.19 | 80.5 | 78.7 | 98.3 |
| | C | 2.25 | 62.7 | 60.5 | 91.5 |
| 13 | Y | 2.39 | 80.4 | 70.5 | 96.9 |
| | M | 2.32 | 81.4 | 79.4 | 98.4 |
| | C | 2.16 | 70.6 | 60.7 | 93.5 |
| 14 | Y | 2.28 | 81.0 | 62.5 | 99.6 |
| | M | 2.36 | 82.3 | 70.9 | 99.3 |
| | C | 2.14 | 67.0 | 62.4 | 92.6 |

TABLE 15

Receiving Layer Composition and EP Image Performance

| | | Maximum | Light resistance test | | Dark fading test |
|---|---|---|---|---|---|
| Example | Color | dye density | Max. density | Density 1.0 | Density 1.0 |
| 15 | Y | 2.26 | 83.2 | 62.1 | 99.6 |
| | M | 2.11 | 80.5 | 79.1 | 99.8 |
| | C | 1.93 | 72.1 | 69.5 | 99.1 |
| 16 | Y | 2.40 | 81.5 | 71.5 | 96.3 |
| | M | 2.26 | 80.0 | 70.1 | 97.2 |
| | C | 2.15 | 62.1 | 59.2 | 92.7 |
| 17 | Y | 2.39 | 81.6 | 71.1 | 99.1 |
| | M | 2.20 | 80.2 | 70.6 | 98.5 |
| | C | 2.15 | 69.3 | 59.3 | 93.2 |
| Comparative ex. 1 | Y | 1.34 | 39.2 | 21.5 | 75.0 |
| | M | 1.11 | 50.4 | 30.8 | 81.4 |
| | C | 0.92 | Color loss | Color loss | 80.5 |
| Comparative ex. 2 | Y | 1.56 | 45.8 | 30.1 | 71.0 |
| | M | 1.45 | 59.3 | 26.5 | 76.4 |
| | C | 1.01 | 18.1 | Color loss | 68.5 |

*1Y: Yellow
M: Magenta
C: Cyan

It is learned that if polyaromatic carboxylic acid ester or its copolymer to which an ester compound or urethane compound is added is used, the aspects of durability such as the light resistance and the fading resistance are further improved.

We claim:

1. Video printing paper having a receiving layer to which a dyestuff melted or sublimated by heating is transferred, and on which an image is formed by the dyestuff transferred to said receiving layer, said video printing paper comprising said receiving layer containing polyvinyl aromatic carboxylic acid ester or copolymer thereof.

2. Video printing paper as claimed in claim 1 wherein said receiving layer comprises resin compatible with the polyvinyl aromatic carboxylic acid ester or the copolymer thereof by 50 percent by weight or less.

3. Video printing paper as claimed in claim 1 or 2 wherein said receiving layer comprises a compound for enhancing dyeing property.

4. Video printing paper as claimed in claim 3 wherein said compound for enhancing dyeing property is an ester compound or a urethane compound.

5. Video printing paper as claimed in claim 4 wherein an amount added of said ester compound or said urethane compound is 1 to 70 percent by weight for the polyvinyl aromatic carboxylic acid ester or the copolymer thereof.

* * * * *